US 8,352,856 B2

(12) United States Patent
Fillion et al.

(10) Patent No.: US 8,352,856 B2
(45) Date of Patent: Jan. 8, 2013

(54) SYSTEMS AND METHODS TO RESIZE DOCUMENT CONTENT

(75) Inventors: Claude S. Fillion, Rochester, NY (US); Vishal Monga, State College, PA (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 12/616,423

(22) Filed: Nov. 11, 2009

(65) Prior Publication Data

US 2011/0113323 A1  May 12, 2011

(51) Int. Cl.
*G06F 17/00* (2006.01)

(52) U.S. Cl. ........ 715/243; 715/246; 715/252; 715/253; 715/788; 715/600; 715/815; 382/173; 382/175

(58) Field of Classification Search .................. 715/243, 715/246, 252, 253, 788, 800, 815; 382/173, 382/175
See application file for complete search history.

(56) References Cited

U.S. PATENT DOCUMENTS

| | | | | |
|---|---|---|---|---|
| 6,665,841 B1 * | 12/2003 | Mahoney et al. | ............. | 715/204 |
| 7,177,488 B2 * | 2/2007 | Berkner et al. | ............. | 382/298 |
| 7,555,711 B2 * | 6/2009 | Chao et al. | ............. | 715/246 |
| 7,561,723 B2 * | 7/2009 | Goldberg et al. | ............. | 382/115 |
| 7,574,069 B2 * | 8/2009 | Setlur et al. | ............. | 382/276 |
| 7,788,579 B2 * | 8/2010 | Berkner et al. | ............. | 715/243 |
| 7,792,362 B2 * | 9/2010 | Berkner et al. | ............. | 382/176 |
| 7,900,137 B2 * | 3/2011 | Ivarsoy et al. | ............. | 715/238 |
| 7,940,929 B1 * | 5/2011 | Sengupta | ............. | 380/51 |
| 7,941,750 B2 * | 5/2011 | Laughlin | ............. | 715/274 |
| 8,023,738 B1 * | 9/2011 | Goodwin et al. | ............. | 382/175 |
| 2002/0120653 A1 * | 8/2002 | Kraft et al. | ............. | 707/529 |
| 2004/0004641 A1 * | 1/2004 | Gargi | ............. | 345/848 |
| 2006/0066905 A1 * | 3/2006 | Takashima et al. | ............. | 358/1.18 |
| 2006/0152748 A1 * | 7/2006 | McCarthy et al. | ............. | 358/1.13 |
| 2009/0063280 A1 * | 3/2009 | Wurster et al. | ............. | 705/14 |
| 2010/0021069 A1 * | 1/2010 | Fan et al. | ............. | 382/224 |

OTHER PUBLICATIONS

Fan, Zhigang, et al., Segmentation for Mixed Raster Contents with Multiple Extracted Constant Color Areas, SPIE vol. 5667, p. 251-262, 2005 SPIE and IS&T.
Avidan, Shai, et al., Seam Carving for Content-Aware Image Resizing, ACM Transactions on Graphics, vol. 26, No. 3 SIGGRAPH 2007.

* cited by examiner

*Primary Examiner* — Stephen Hong
*Assistant Examiner* — Matthew Ludwig
(74) *Attorney, Agent, or Firm* — Fay Sharpe LLP

(57) ABSTRACT

A system resizes content within a document that includes a document segmenter that receives a document that contains content. The document segmenter analyzes the content within the document and segments the content into a plurality of object types. An object priority applicator determines a class value associated with each object type. A location scaler identifies a datum point for each object type within the document, wherein each datum point maintains a relative location to one another regardless of document resizing. An object sizing component resizes each object based at least in part upon the class value.

20 Claims, 15 Drawing Sheets

SYSTEMS AND METHODS TO RESIZE DOCUMENT CONTENT

BACKGROUND

This invention generally relates to resizing of content within documents. In one particular application, document content is segmented into objects, wherein each object is assigned a class value. The objects can be located and resized based at least in part upon the class value associated therewith. It is to be appreciated, however, that substantially any systems and methods are contemplated.

The creation of documents via digital means is generally accomplished utilizing computer-based production tools. Each document can contain a variety of content types such as text, images, graphics, logos and whitespace (e.g., background). Resizing of some or all of this content can be desired to accommodate a wide range of applications that includes varying source resolutions and/or the requirement of rendering on different paper sizes. For example, an emphasis on text may be desired for relatively smaller renderings of a document. In contrast, an emphasis on images may be desired for relatively larger renderings.

The process of resizing digital content, such as an image, is referred to as scaling. Conventional approaches to resize content to a target dimension typically employs isomorphic or anamorphic scaling based on well established and simple signal processing principles. These processes typically involve a tradeoff between efficiency, smoothness and sharpness. As the size of an image is increased, the pixels which comprise the image become increasingly visible, causing unwanted artifacts to appear.

There are several methods, however, to increase the number of pixels that an image contains to attempt to even out the appearance of the original pixels. In one approach, a nearest neighbor interpolation can be employed to double the size of an image. In this method, every pixel is replaced with four pixels of the same color. The resulting image is larger than the original and preserves all the original details but has undesirable jaggedness. Moreover, diagonal lines can appear to show a characteristic stairway shape.

Interpolation techniques can be utilized to provide better results than a nearest neighbor system to change the size of an image. Such techniques, however, can cause undesirable softening of details and can still render a somewhat jagged image. Bicubic interpolation or an hqx scaling algorithm can be utilized to compensate for such deficiencies. Such methods can produce sharp edges and maintain a high level of detail when executing rescaling operations.

While these techniques are fast and simple, limitations are well known in that they do not respect underlying image content and resizing. For this reason, content aware image resizing methods have been developed recently, such as U.S. patent application Ser. No. 12/533,880, filed Jul. 31, 2009; Ser. No. 12/330,879, filed Dec. 9, 2009; Ser. No. 12/369,790, filed Feb. 12, 2009; and, Ser. No. 12/544,561, filed Aug. 20, 2009, all incorporated herein by reference. The philosophy of these techniques can be summarized in two steps. First, a geometric and/or entropic descriptor is utilized to quantify relative importance of image pixels. Second, connected paths of low importance pixels are determined to the image called seams that have low energy.

Energy is determined as a summed up importance of pixels and selective dropping of these low energy seams can reduce size. For example, U.S. patent application Ser. No. 12/533,880 proposes notions of pixel importance that are well adapted based on application. U.S. patent application Ser. Nos. 12/330,879 and 12/369,790 focus on selective removal of image seams based on image content, such as the optimization of document content. Finally, U.S. patent application Ser. No. 12/544,561 performs reduction based on knowledge of constituent object types for pdf documents. These references, however, are only focused on one aspect of resizing—image reduction.

Unfortunately, utilizing such methods for image enlargement is not as straight forward. For example, one could conceivably construct an image importance map and insert seams in high importance areas. Unfortunately, this approach is fundamentally limited by the lack of information available for insertion into the high importance area. For this reason, repetition of adjacent pixels does not provide amplification. The result instead is a highly noticeable and undesirable geometric distortion. An alternative approach, proposed in Aviden, Shai and Shamir, Ariel 2007 Seam Carving for Content-Aware Image Resizing, inserts seams again in low importance areas. The philosophy is that when images are reduced using a content-aware technique, the new enlarged image yields the original one as a result. This approach, however, does not achieve amplification of particular (e.g., visually important) content.

Accordingly, systems and methods are needed to optimally resize particular content within a document.

BRIEF DESCRIPTION

In one aspect, a system resizes content within a document that includes a document segmenter that receives a document that contains content. The document segmenter analyzes the content within the document and segments the content into a plurality of object types. An object priority applicator determines a class value associated with each object type. A location scaler identifies a datum point for each object type within the document, wherein each datum point maintains a relative location to one another regardless of document resizing. An object sizing component resizes each object based at least in part upon the class value.

In another aspect, a computer-based method is employed to resize content within a document. A processor and a memory is employed to receive a document that contains content. The content within the document is segmented into a plurality of objects, wherein each object is related to a particular content type. A class value is applied to each object; and a location of each object is scaled within the document. Each object is resized based at least in part upon the object location and/or the class value. A revised document is output that includes the resized objects.

In yet another aspect, a computer-based method is used to enlarge content within a document. A processor and a memory segments content within the document into an object, wherein each object is associated with a particular content type. Complexity and/or a location of each object within the document is evaluated. A class value is associated with each object based at least in part upon the complexity and/or location of the object. A datum point within each content containing object is identified wherein objects are enlarged relative to the datum points identified. A revised document is output that includes the resized objects.

DETAILED DESCRIPTION

The exemplary embodiments disclosed herein describe systems and methods to resize particular content within a document. Content within a document is first segmented into a plurality of objects via one or more techniques utilizing an algorithm, imaging software, metadata, etc. Second, varying degrees of importance are applied to each object such as an image, a text, a logo, a graphic, etc. to create a class importance map. The importance attached to each object can be done automatically based on content (e.g., geometric/entropic measures of the class) or as user input. Objects can be scaled based around a predefined datum to meet resizing requirements. Finally, each object can be resized based at least in part upon the priority associated with each object class. In the final resized document, high importance classes are allowed more coverage than low importance ones, resulting in visually more effective results.

Figure 1:
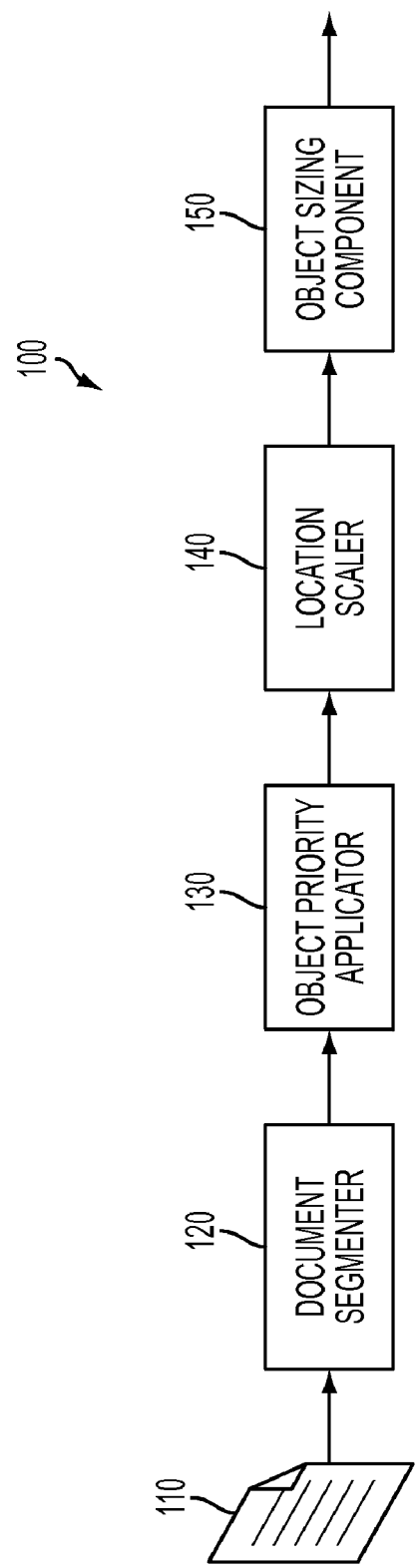
FIG. 1 illustrates a system that resizes content within a document, in accordance with an exemplary embodiment.

FIG. 1 illustrates a system 100 that facilitates object resizing within a document based on content awareness. A document 110 that contains a plurality of disparate content such as images, logos, text, etc. is received by a document segmenter 120. The document segmenter 120 analyzes the document 110 and categorizes the content within the document 110 as a type of object. An object priority applicator 130 receives the segmented object information from the document segmenter 120 and applies a class value to each object identified by the document segmenter 120. The class value can be determined via user input, an algorithm, or other means.

A location scaler 140 determines the size and shape of a footprint associated with each object. In one example, an object footprint can be defined by same/similar content within a predetermined border. In one example, one content type (e.g., text) within a predetermined distance of the same content type is grouped within the same footprint. The outside edge of content that meets this criterion is used to define the object border. In another example, the edge of an image or logo defines the object border. It is to be appreciated that substantially any algorithm can be employed to define object size and/or shape within a document based on any number of measures.

Further, the location scaler 140 identifies a datum point from which to resize each object. The datum point can insure that objects maintain a proximity and layout similar to that of the original document. In one example, the datum point is a geometric center of each footprint. In another example, a datum point is set at a corner of each object or within a predefined direction and distance relative to the object. It is to be appreciated that substantially any datum location can be associated with each object to facilitate resizing.

An object sizing component 150 receives information from the location scaler 140 and resizes the objects based at least in part upon the class value associated with each object. The resizing of each object is performed relative to the datum identified by the location scaler 140. In one example, the resizing of each object is associated with class value. For instance, an image object is enlarged to a greater proportion than the background object as it is associated with a relatively higher class value. In this manner, objects within a document can be resized commensurate with respective class values.

Figure 2:
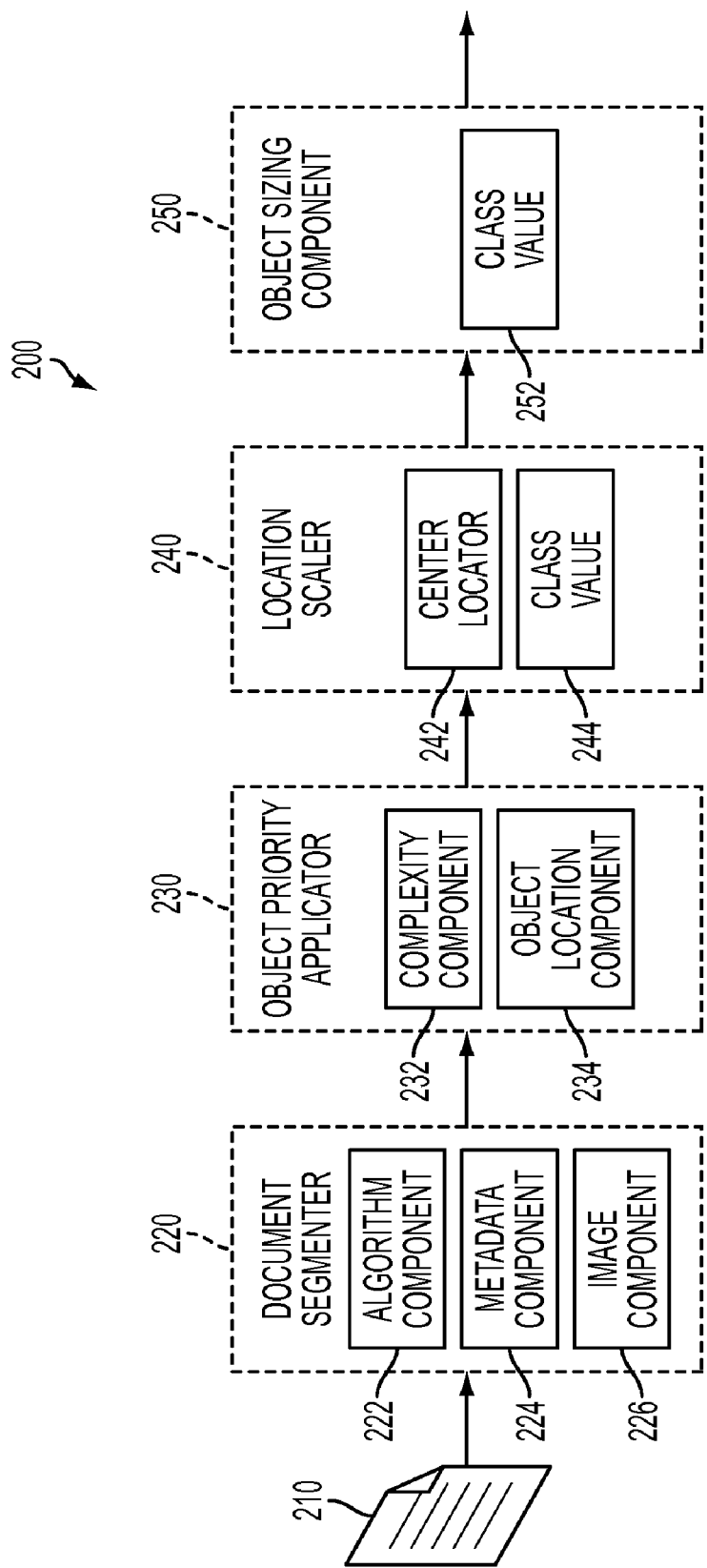
FIG. 2 illustrates a system that resizes content within a document that includes specific segmenting, object priority and scaling components, in accordance with an exemplary embodiment.

FIG. 2 illustrates a system 200 that is utilized to receive a document 210 and resize content within the document 210 based at least in part upon object class and scaling parameters. The system 200 is substantially the same as the system 100 wherein each of the components utilized to facilitate resizing of content has a greater degree of detail. The document segmenter 220 utilizes one or more specific metrics to perform document segmentation including an algorithm component 222, a metadata component 224, and an image component 226. Each of the components 222-226 are utilized to segment a document into one or more objects based on specific properties associated therewith.

For example, the algorithm component 222 utilizes a segmentation algorithm to identify objects within the document 210. In one example, an MRC/MECCA (mixed raster contents/multiple extracted constant color areas) algorithm is employed. MRC is an image representation concept to achieve high compression ratios while maintaining high reconstructed image quality. MECCA has the advantage of ease of decomposition and inherent text enhancement and noise reduction features. The MRC/MECCA algorithm can extract uniform text or other objects from the document 210. In one approach, the algorithm consists of four steps. First, the text and objects are extracted from an image. Next, they are tested for color constancy and other features to determine if they should be represented by the MRC foreground layers. Third, the objects are chosen and then clustered into a color space. Finally, the document 210 is segmented such that each foreground layer codes the objects from the same color cluster.

The metadata component 224 can analyze a document that associates metadata with particular object types. The metadata can identify objects based upon the metadata descriptors. In one example, a pdf document created via Adobe Acrobat can contain metadata that identifies content within the document 210. In one instance, metadata related to a text block includes an explicit descriptor that identifies it as such. Similarly, metadata related to image content can have an explicit descriptor to identify it as an image and so on. In this manner, the document segmenter 220 utilizes the metadata component 224 to extract appropriate metadata from the document 210 to identify and segment objects within the document 210. A memory store (not shown) can be employed by the metadata component 224 to retrieve look-up tables or other information sources that contain a predetermined association listing of metadata to various object types.

The image component 226 can be employed to identify objects within the document 210 via an imaging interface. In one example, the image component 226 allows a user to manually select areas of the document 210 via imaging software. For instance, a user can click one corner of a rectangular object segment and drag a mouse across to capture desired content via a bounding box. Once a plurality of bounding boxes associated with disparate objects and object types have been created, particular associations can be made via the imaging software and/or one of the other components within the document segmenter 220.

An object priority applicator 230 receives the object information from the document segmenter 220 and associates a class with each object. The class associated with each object can be based on at least two disparate metrics. A complexity component 232 can identify the complexity of each object and associate an object class in accordance with the complexity identified. In one example, complexity is greater for objects that contain content than objects such as a background, which contain no content.

An object location component 234 can identify the location of each object relative to a particular datum as a point of evaluation to associate a class with each object. For example, a datum can be a geometric center of the page 210 wherein objects that are more proximate to the datum have a higher class value than objects that are further away. A location scaler 240 identifies the location for scaling each of the objects identified by the document segmenter 220. The location scaler 240 can utilize a center locator 242 and/or a class value 244 to resize each object within the document 210.

The center locator 242 can identify the border of each object and perform an analysis to ascertain the size and shape of each object. The center locator 242 can identify a geometric center of each object within the document 210. Appropriate geometric equations can be utilized to facilitate this process. For example, for a rectangular shaped object, the length and width can be determined wherein the center is located at the halfway point of the length where the halfway point of the length intersects the halfway point of the width.

Alternatively, or in addition, an analysis can be performed on the class levels provided by the object priority applicator 230 to determine the datum from which to resize each of the objects.

An object sizing component 250 includes a class value 252 as identified by the object priority applicator 230. The class value 252 is the class value that has been associated with each object within the document 210. The object sizing component 250 can utilize the class value 252 to provide disparate resizing to each object class. For example, objects with a higher class level can be resized in greater proportion relative to objects with a lower class level.

Alternatively, thresholds can be established to resize objects within the document 210. For example, objects that have a class value greater than a predetermined threshold can be resized to the same proportion (e.g., 120%) as objects that are also above the same threshold. Such resizing can be disparate for objects with a class level that is below such a predetermined threshold. It is to be appreciated that substantially any number of threshold levels can be established for purposes of resizing objects within the document 210. The resized content is output from the object sizing component 250 as a modified version of the document 210.

Figure 3:
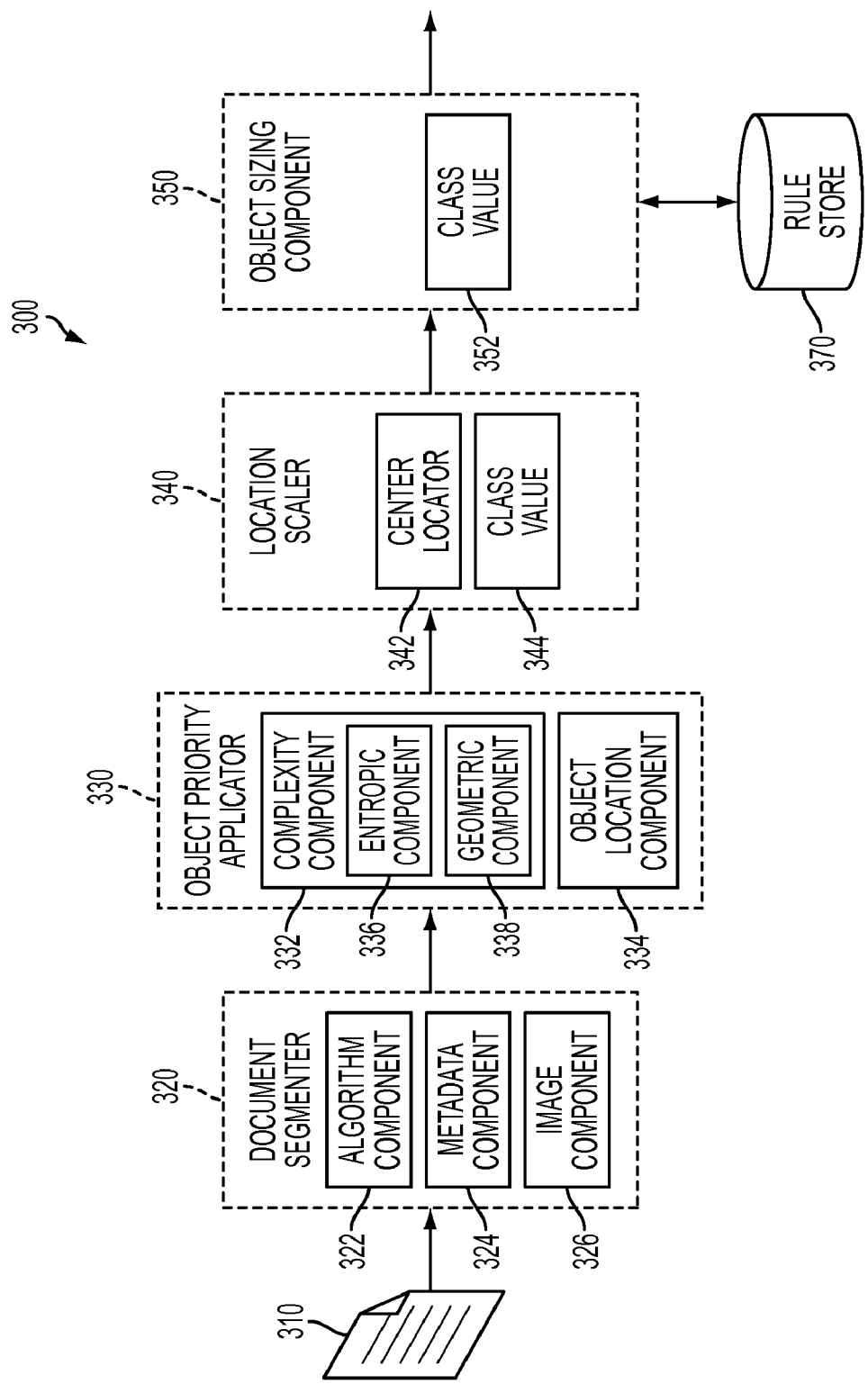
FIG. 3 illustrates a system that resizes content within a document wherein a complexity component includes specific measurement components and wherein a rule store is utilized to interface with object sizing, in accordance with an exemplary embodiment.

FIG. 3 illustrates a system 300 that includes a document 310, a document segmenter 320, an object priority applicator 330, a location scaler 340 and an object sizing component 350. The components 320-350 are substantially the same as those within the system 200. The object priority applicator 330 contains a complexity component 332 that can perform automatic computation of complexity for each object can be based on low level image content. Low level measures of complexity can be measured for each object via an entropic component 336 and/or a geometric component 338.

The entropic component 336 analyzes the level of complexity for each object and calculates a commensurate entropic value. In one example, the entropic component 336 identifies the number of disparate pixels within the object and further the disposition of each pixel located therein. For example, a blue box which is a rectangular box would require a set quantity of pixels configured in a substantially rectangular space. As there is a relatively basic configuration with a single color, the blue box would have a low entropy value. In contrast, an image of a zebra would include two disparate colors of pixels (e.g., black and white) configured in a non-uniform manner to create striping on the side of the animal. Accordingly, the zebra would have a relatively high entropy value.

In one example, the entropic component 336 utilizes Equation 1 to calculate an entropic complexity value for each object, wherein the object footprint is defined as a region R.

$$e(R) = -\sum_{k=0}^{G-1} P(k)\log_2(P(k)) \quad (1)$$

Where G is the number of distinct pixel values in the region R and P(k) is the probability of each pixel value.

Similarly, the geometric component 338 can be employed to calculate a geometric complexity value. In this case, the geometric component 338 evaluates the number of lines or edges within each object. In one example, lines are identified that separate objects within an image, such as sky adjacent to a building. In one example, the geometric complexity value is determined utilizing an L1 norm of a gradient within an object (e.g., an M×N region R). This geometric complexity value can be calculated using Equation 2 below.

$$e(R) = -\sum_{i=0}^{M-1} \sum_{j=0}^{N-1} \left( \left| \frac{\partial}{\partial i} R(i,j) \right| + \left| \frac{\partial}{\partial j} R(i,j) \right| \right) \quad (2)$$

An alternative is to have a user input relative to importance values for classes identified by the document segmenter 320. Alternative complexity measures can be found in U.S. patent application Ser. No. 12/174,767. Substantially, any other complexity measure can be utilized by the object priority applicator 330.

A rule store 370 can interface with the object sizing component 350 to provide predetermined parameters associated with the sizing of each object within the document 310. The rules store 370 can be utilized to ensure that each object is not resized in an inappropriate manner to mask or interfere with adjacent and/or proximate objects. The rules store 370 can contain substantially any number of predetermined rules for the object sizing component 350 to follow. In one example, the rules store 370 prohibits any object from decreasing from its original size and secondly, identifies and imposes upper bounds of a maximum size of enlargement for each object and/or object type. Such upper bounds can be dictated by the proximity of objects that surround a subject object, their associated class value and/or the enlargement of the overall content within the document 310.

Figure 4:
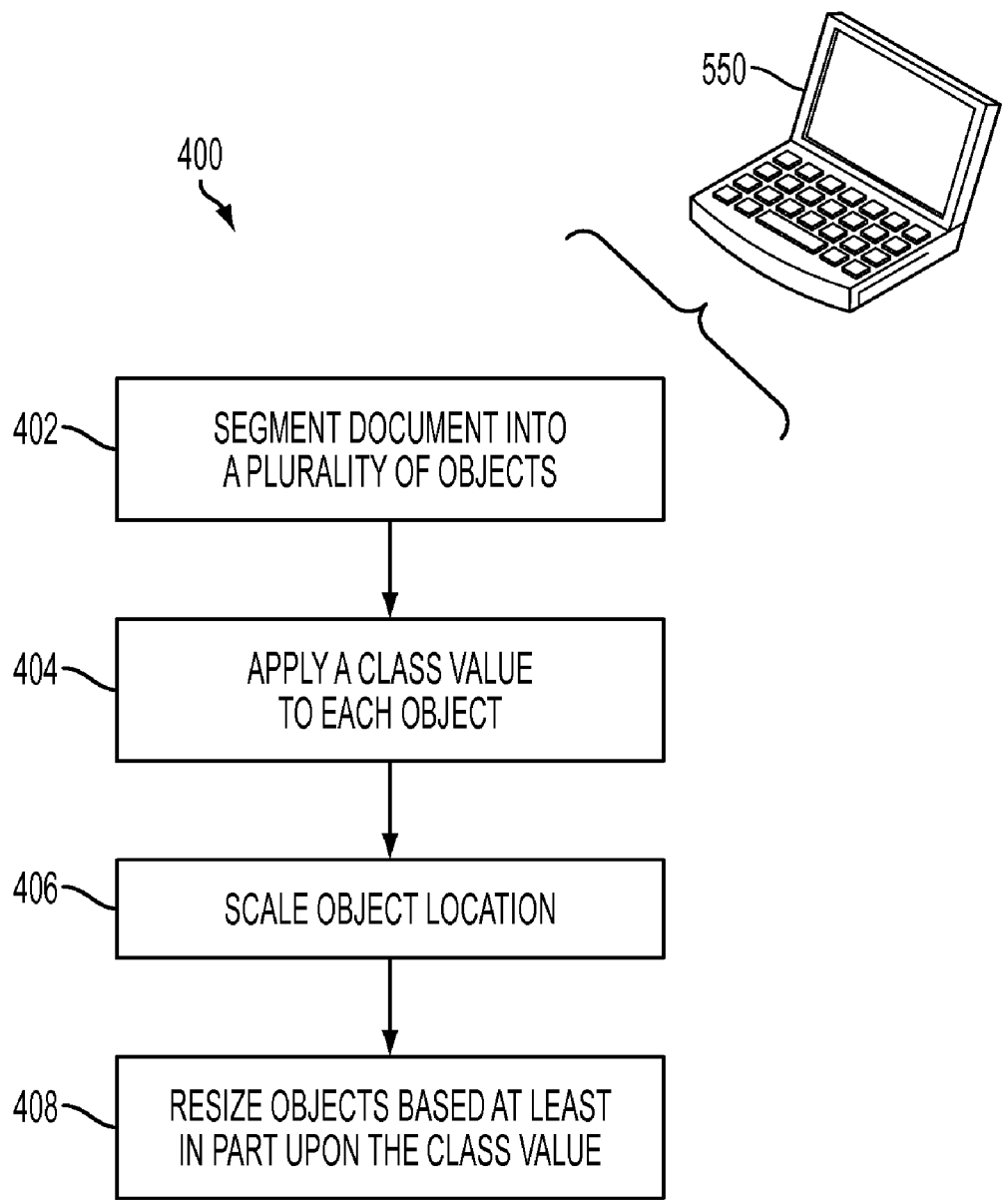
FIG. 4 illustrates a method to resize content within a document based at least in part upon an associated class value, in accordance with an exemplary embodiment.

FIG. 4 illustrates a methodology 400 to resize objects within a document based on content awareness. At reference numeral 402, a document is segmented into a plurality of objects. Segmentation can be based on the type of content within the document such as a text box, a background, an image, a logo, etc. and further define each object footprint. Each content type can be associated with a particular object. At 404, a class level is applied to each object. The class level can be associated with a predetermined importance of content within the document such that objects of greater importance are assigned a relatively higher class level.

At 406 an object locations are scaled within the document. In one example, the object footprint is substantially rectangular and the datum point is located in the geometric center of each object. At 408, objects are resized based at least in part upon the class level applied at 404. The resizing of objects can occur based on the locations established at 406. Alternatively or in addition, parameters can be utilized to limit the resizing of objects to prohibit content from one object from blocking content within another object. In this manner, the method 400 emphasizes content with greater importance and deemphasizes content with less importance.

Figure 5:
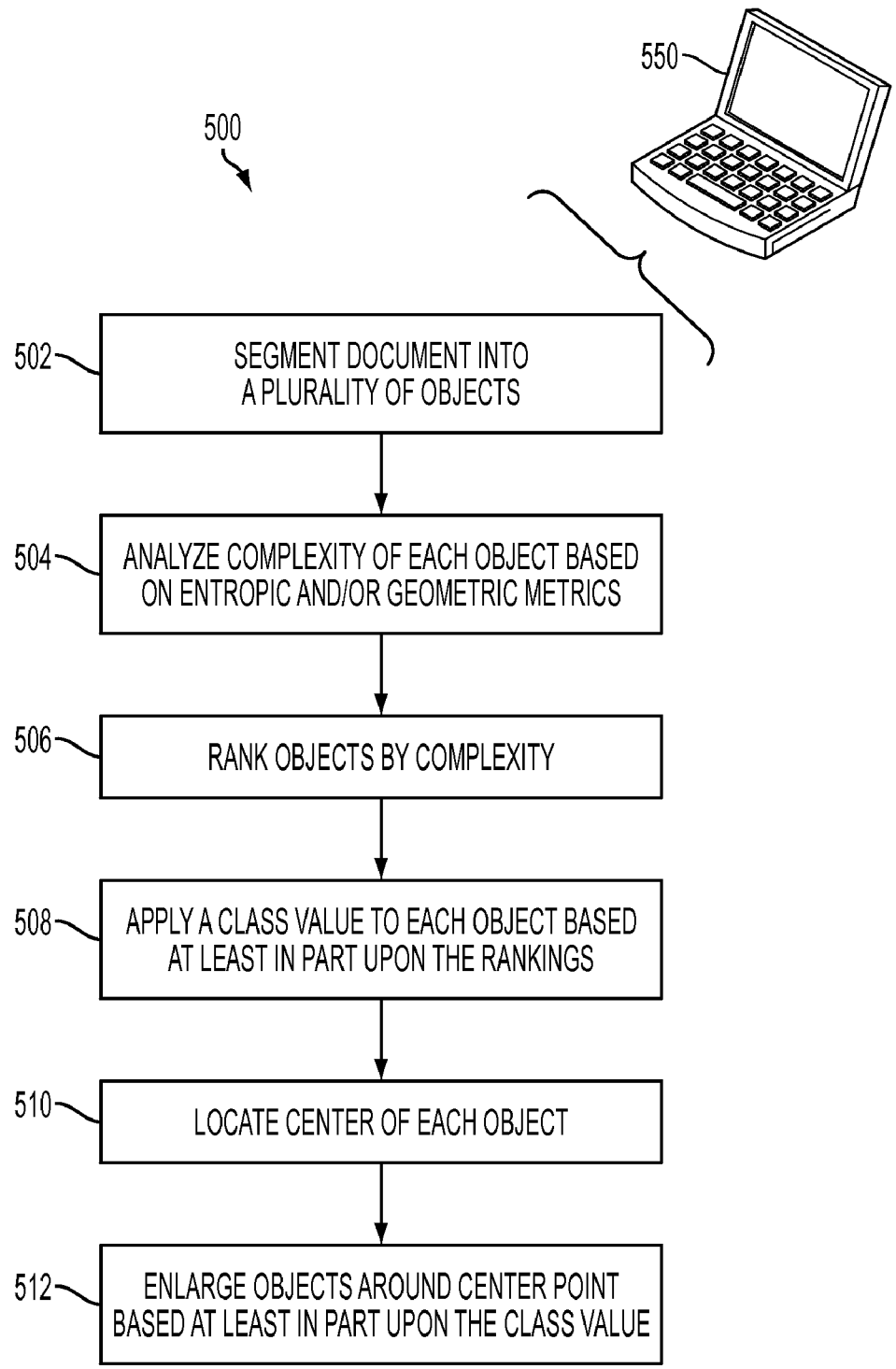
FIG. 5 illustrates a method to locate and resize content within a document based at least in part upon an associated class value, in accordance with an exemplary embodiment.

FIG. 5 illustrates a method 500 to enlarge objects around a center point based at least in part upon an associated class level. At 502, a document is segmented into a plurality of objects. Segmentation can be determined based on similarity of content, proximity of content, etc. In one example, images are defined as a first object type, text as a second object type and the background as a third object type. At 504, a complexity of each object is analyzed based on an entropic and/or a geometric metric. The complexity can be explicitly defined via one or more equations such as equations 1 and 2 set forth above. In one example, the entropic value of an image object is 27, a text object is 15 and a background object is 0. At 506, the objects are ranked by complexity. In this example, the image object is ranked highest followed by the text object and a last by the background object.

At 508, a class is applied to each object based at least in part upon the rankings. In this manner, objects with a greater complexity such as images can receive a higher class level than objects with relatively no complexity such as a background. At 510, the center of each object is located to serve as a datum for resizing the object. At 512, the objects are enlarged around the center point located at 510. The enlargement of the object is based at least in part upon the class level associated with each object as applied at 508.

Figure 6:
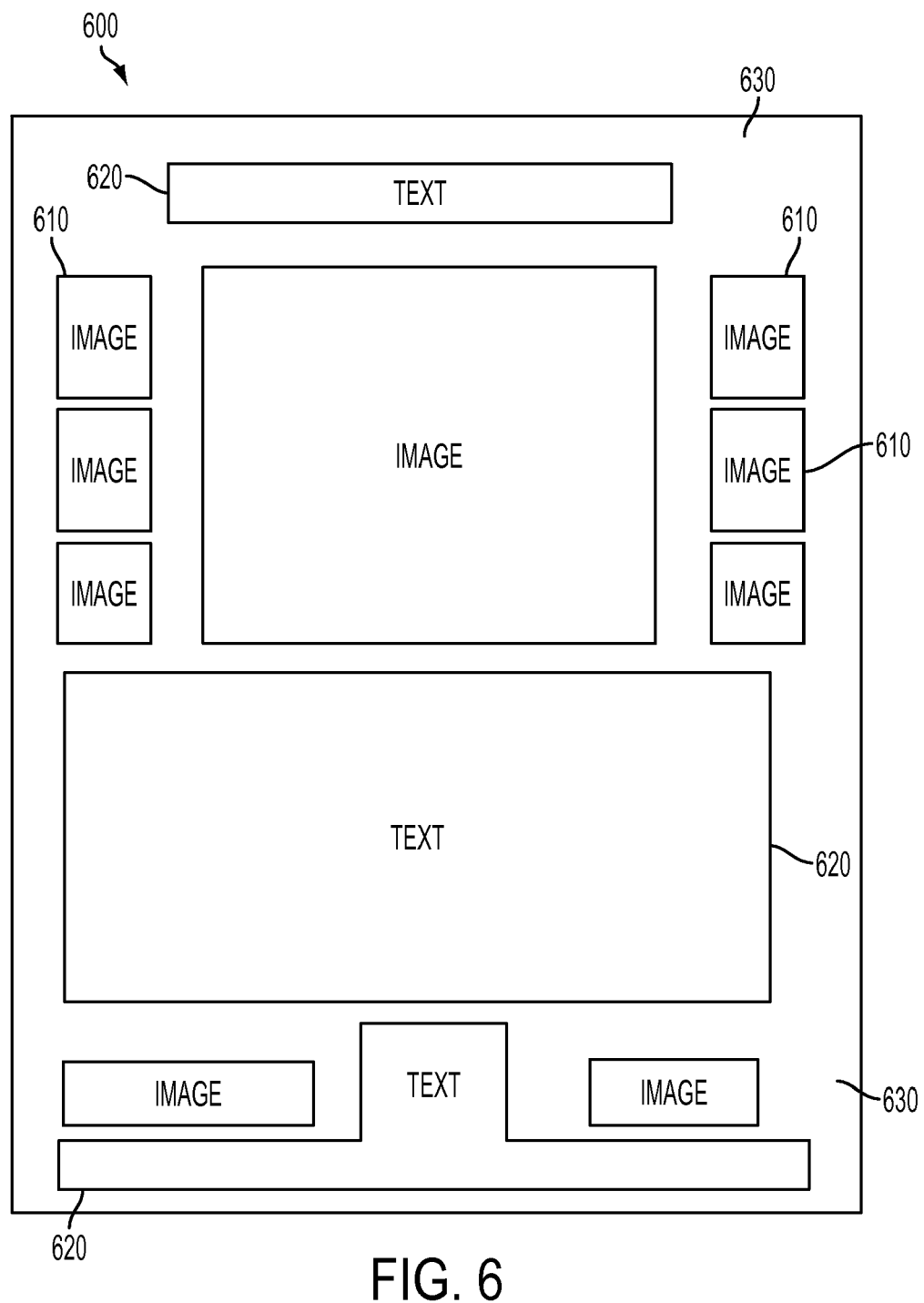
FIG. 6 illustrates a first exemplary document that includes a plurality of disparate content, in accordance with an exemplary embodiment.

FIG. 6 illustrates a first exemplary embodiment of a document 600 that contains exemplary content therein. In this example, the document 600 includes images 610, text 620 and background 630. It is to be appreciated that the images, text and background are called out in exemplary locations within the document 600 and are representative of all like content within the document. In one example, the document 600 is substantially equivalent to the documents 110, 210, and 310 as discussed above.

Figure 7:
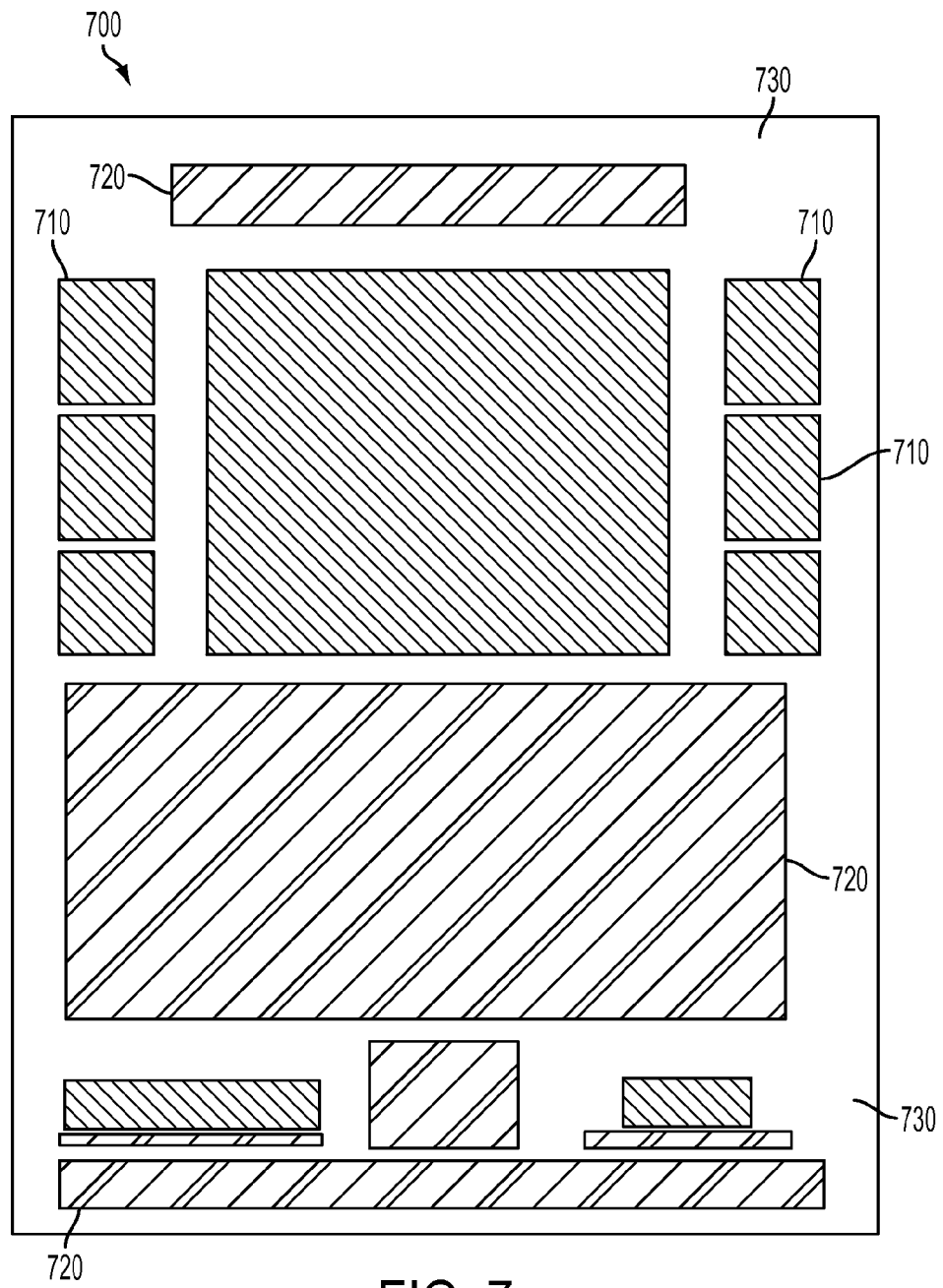
FIG. 7 illustrates the first exemplary document that is presented as a plurality of objects, wherein each object is associated with a particular content type, in accordance with an exemplary embodiment.

FIG. 7 illustrates the document 600 subsequent to a document segmentation process. In this example, similar content from the document 600 is specified as an object wherein object of similar content type is segmented as the same object. In this embodiment, the segmented document 700 includes a first object 710, a second object 720 and a third object 730. Objects that contain the same cross-hatching belong to the same object type. The segmented document 700 can represent output from the document segmenter 120, 220, and/or 320 discussed above.

In one example, the first object 710 relates to images, the second object 720 relates to text and the third object 730 relates to the background. It is to be appreciated that the first object 710, the second object 720 and the third object 730 can be associated with substantially any content and further that the objects segmentations can consist of sub-segments that consist of sub-objects related to each object. In one example, the second object 710 is further segmented as associated with image areas, could be further segmented into an image class and a graphics class.

Once the segmented document 700 is segmented into the object types 710, 720, and 730, a further analysis can be performed to associate a class level with each object type. In one example, a complexity analysis is conducted with each object type wherein the object type with the greatest complexity is associated with the highest class value and the object type with the second highest complexity is associated with the second highest class value and so on. Content within each instance of the object within a segmented document can be analyzed in substantially any manner. For instance, the complexity of each instance of the object can be summed and averaged over the total number of objects within the document, the total amount of relative space associated with the content, the highest and/or lowest instance of complexity within the object type, etc.

In another example, the location of each object type can be utilized to associate a class value to each object type. In this example, objects that are located closer to the geometric center of the document and/or that account for a highest percentage of space within the content, can receive a class value commensurate therewith. Subsequent to this analysis, the segmented document 700 can be output from an object priority applicator such as 130, 230, and/or 330 discussed above.

Figure 8:
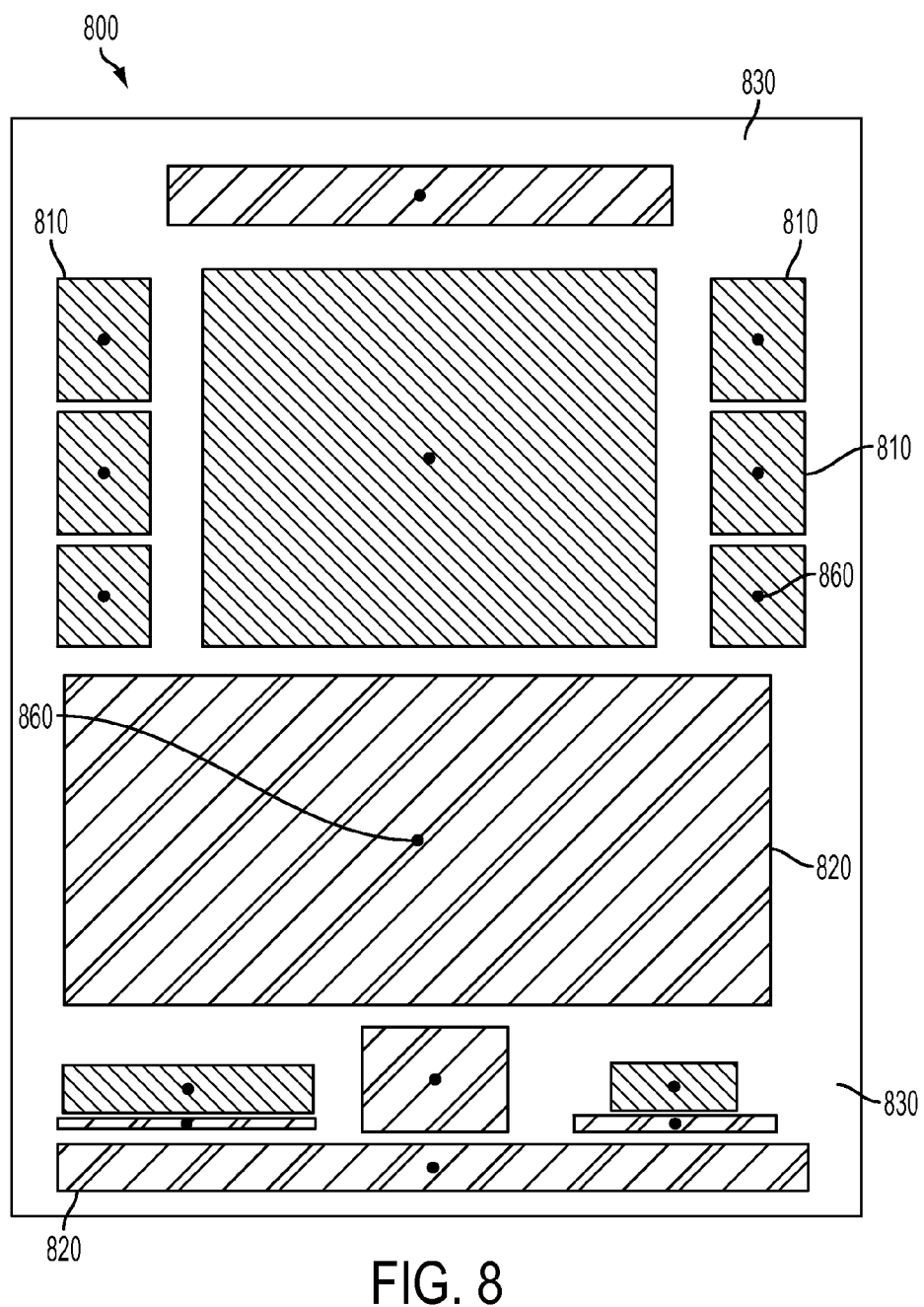
FIG. 8 illustrates an anchor point from which to resize each object within the first exemplary document, in accordance with an exemplary embodiment.

FIG. 8 illustrates a segmented document 800 that includes a plurality of datum points 860 that relate to each object type 810 and 820. In this example, the datum points 860 are located in the geometric center of each object 810 and 820. In this manner, the datum points 860 are utilized to preserve the relative positioning of the various objects within the segmented document 800. The datum points 860 are shown for exemplary purposes only and can vary from object type to object type and further can vary based on the location of the datum within each object type. Generally, the datum points 860 are utilized only with objects that contain content as a user is generally not interested in resizing objects that contain no content, such as background. It is contemplated, however, that a datum point can be associated with a background object as necessary and specific to each application.

Figure 9:
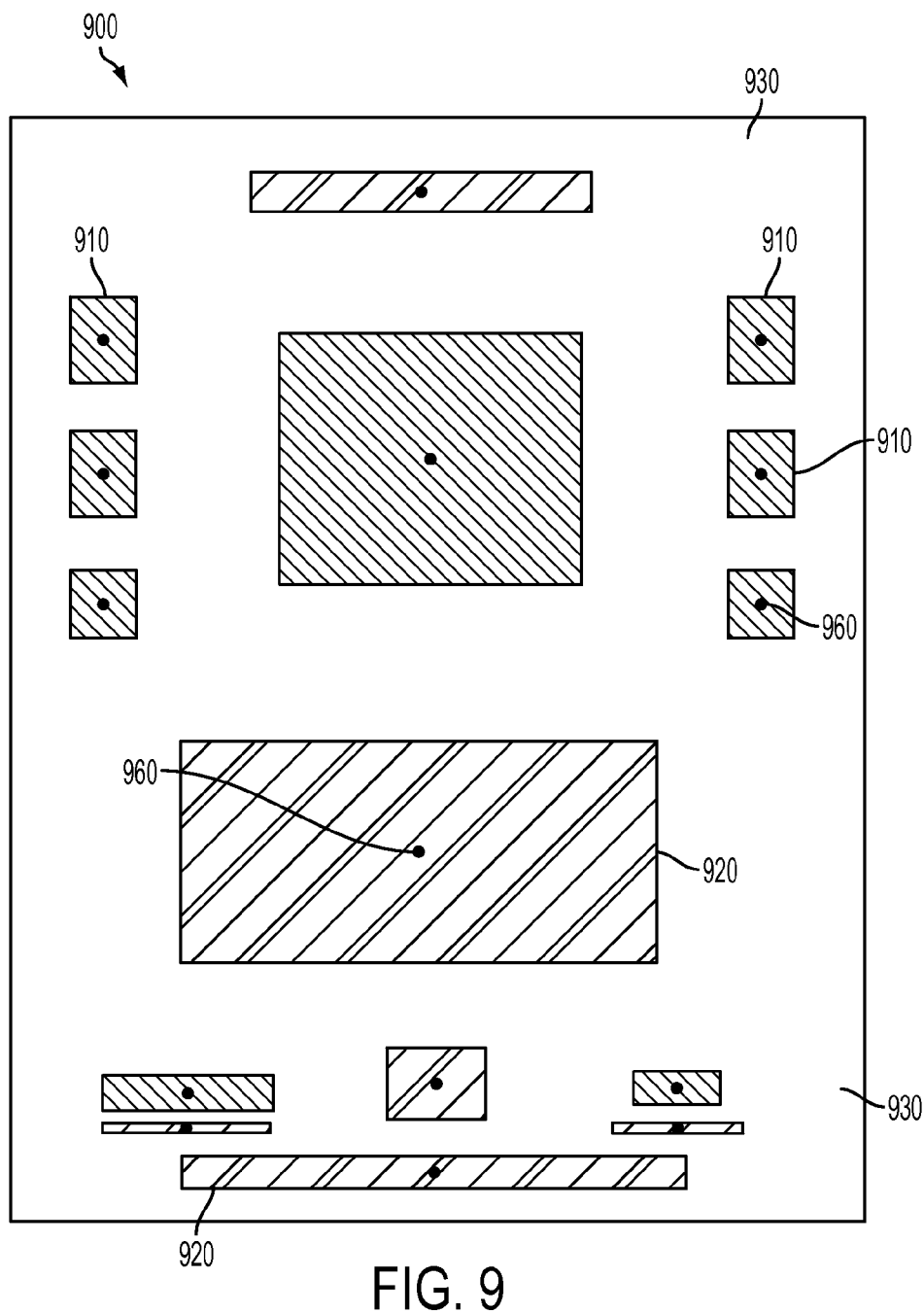
FIG. 9 illustrates the placement of the objects within the first exemplary document onto a 50% larger document, in accordance with an exemplary embodiment.

FIG. 9 illustrates a segmented document 900 that is larger (e.g. 150%) than the segmented document 800. In this example, an object 910 and object 920 are set forth in particular locations within the segmented document 900 based at least in part upon datum points 960. The relative location of the datum points 960 can be dependent upon the relative location of the datum points 860. The relative distance between the datum points 960 can be mapped according to the rescaling percentage of a particular application. In this manner, the datum points 960 preserve the relative positioning of the objects within the segmented document 900. The segmented document 900 can be output from the location scaler 140, 240, and/or 340 as discussed above.

Figure 10:
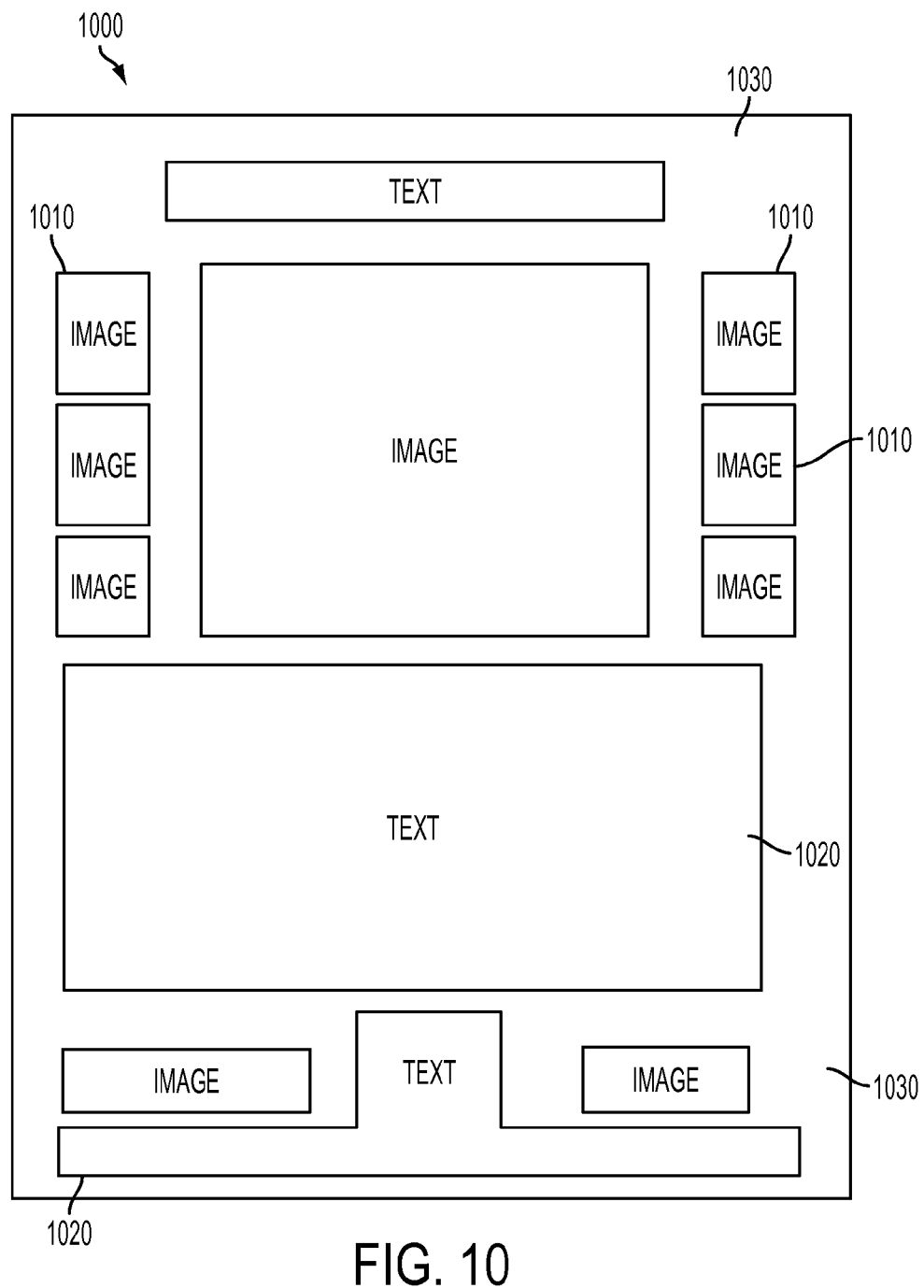
FIG. 10 illustrates the resizing of the objects within the first exemplary document onto a 50% enlargement utilizing standard scaling, in accordance with an exemplary embodiment.

FIG. 10 illustrates a conventional resized document 1000 that can be a larger version of the document 600 (e.g. 150% size increase). The conventional resized document 1000, includes a first object 1010, a second object 1020 and a third object 1030. In this conventional instance, however, the content is increased by a predetermined amount with regard to each and every object type. Therefore, for example, the object type 1030 (e.g., with no content) will be increased the same percentage as the object type 1010. Accordingly, the content within the object types 1010 and/or 1020 may appear less clearly as the object 1030 occupies a large portion of space within the conventional document 1000.

Figure 11:
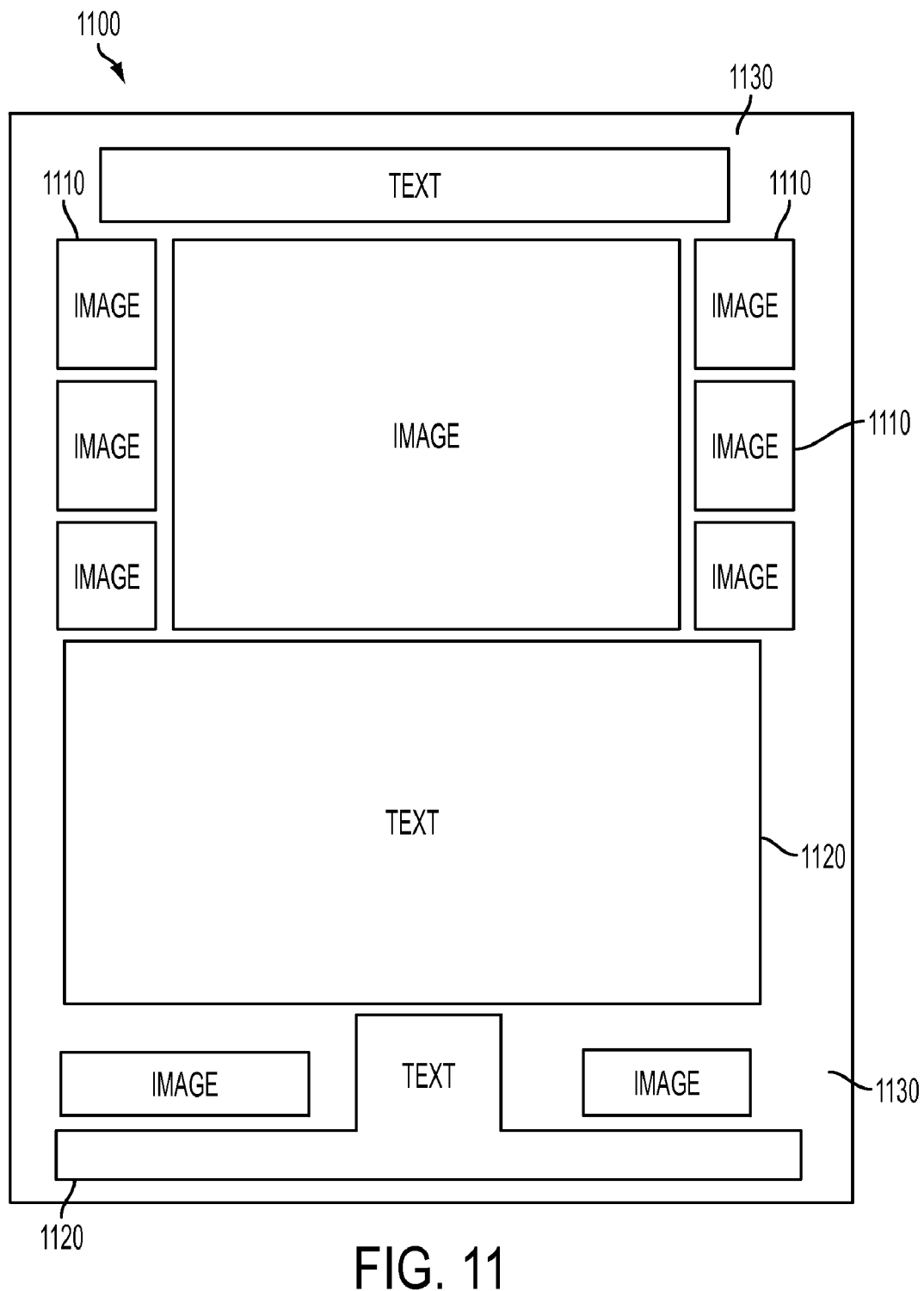
FIG. 11 illustrates the resizing of the objects within the first exemplary document 50% enlargement wherein each object is resized based at least in part upon the class value associated therewith, in accordance with an exemplary embodiment.

In contrast, as illustrated in FIG. 11, a content-aware enlarged document 1100 includes a first object type 1110, a second object type 1120 and a third object type 1130. In this example, the object types 1110, 1120 contain content and the object type 1130 does not contain content as it is a background. The object types 1110 and 1120 have center points that are substantially identical to the datum points 960 from the location scale document 900. Moreover, the content type is reflective of the percent increase of content associated therewith. As shown, the content within the object types 1110, 1120 occupies a greater amount of space relative to the object type 1130. In this manner, a user is able to readily discern information contained within the document 1100 more readily than in conventional methods, such as the document 1000. It is to be noted that the content within each object type does not impede the viewing of content within any other object type. Such a result can occur from a predefined rule set such as the rule store 370 discussed above.

Figure 12:
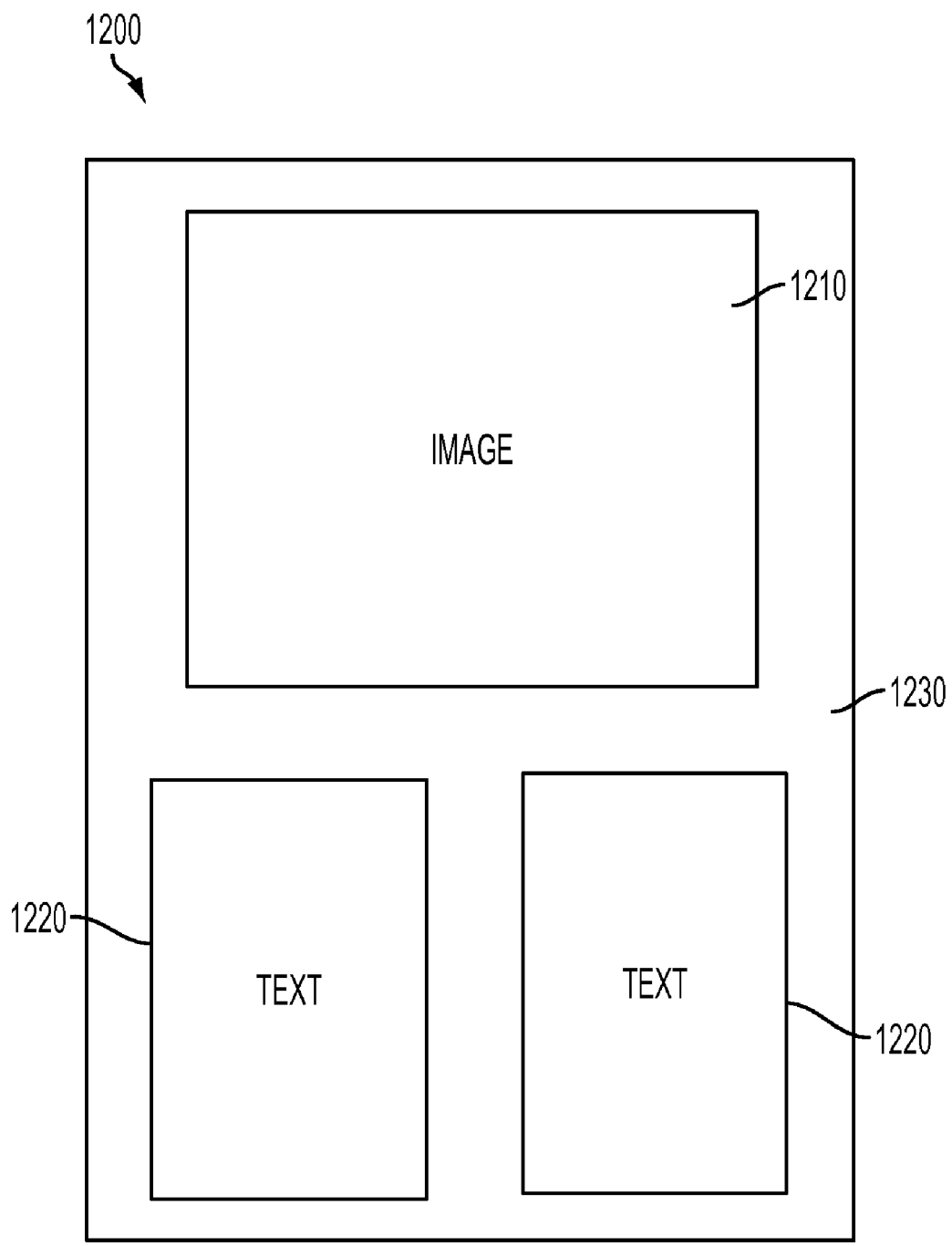
FIG. 12 illustrates a second exemplary document that includes a plurality of disparate content, in accordance with an exemplary embodiment.
Figure 13:
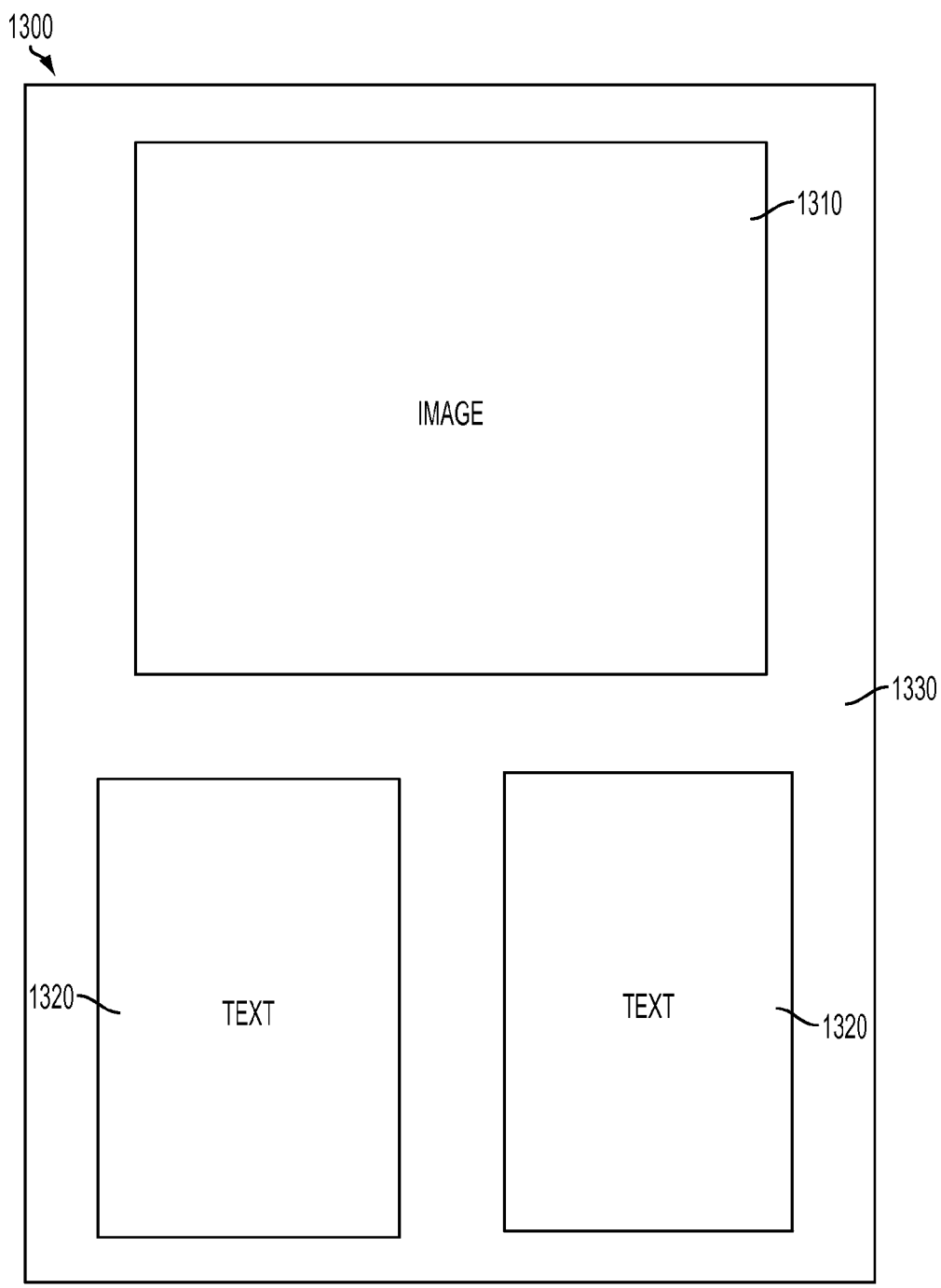
FIG. 13 illustrates 50% enlargement of the content within the second exemplary document utilizing standard scaling, in accordance with an exemplary embodiment.

FIG. 12 illustrates a second exemplary document 1200 that includes a first object type 1210, a second object type 1220 and a third object type 1230. In one example, the first object type 1210 is associated with images, the second object type 1220 is associated with text and the third object type 1230 is associated with a background. FIG. 13 illustrates a conventional document 13 with a 150% enlargement of the content within the document 1200. The document 1300 includes a first object type 1310, a second object type 1320 and a third object type 1330 that can be substantially equivalent to the first object type 1210, the second object type 1220 and the third object type 1230 from the document 1200. In this embodiment, each object type is enlarged by 150% regardless of object type. Thus, a noticeable amount of white space occupies the document 1300 even though it is commensurate with the relative amount of white space within the document 1200.

Figure 14:
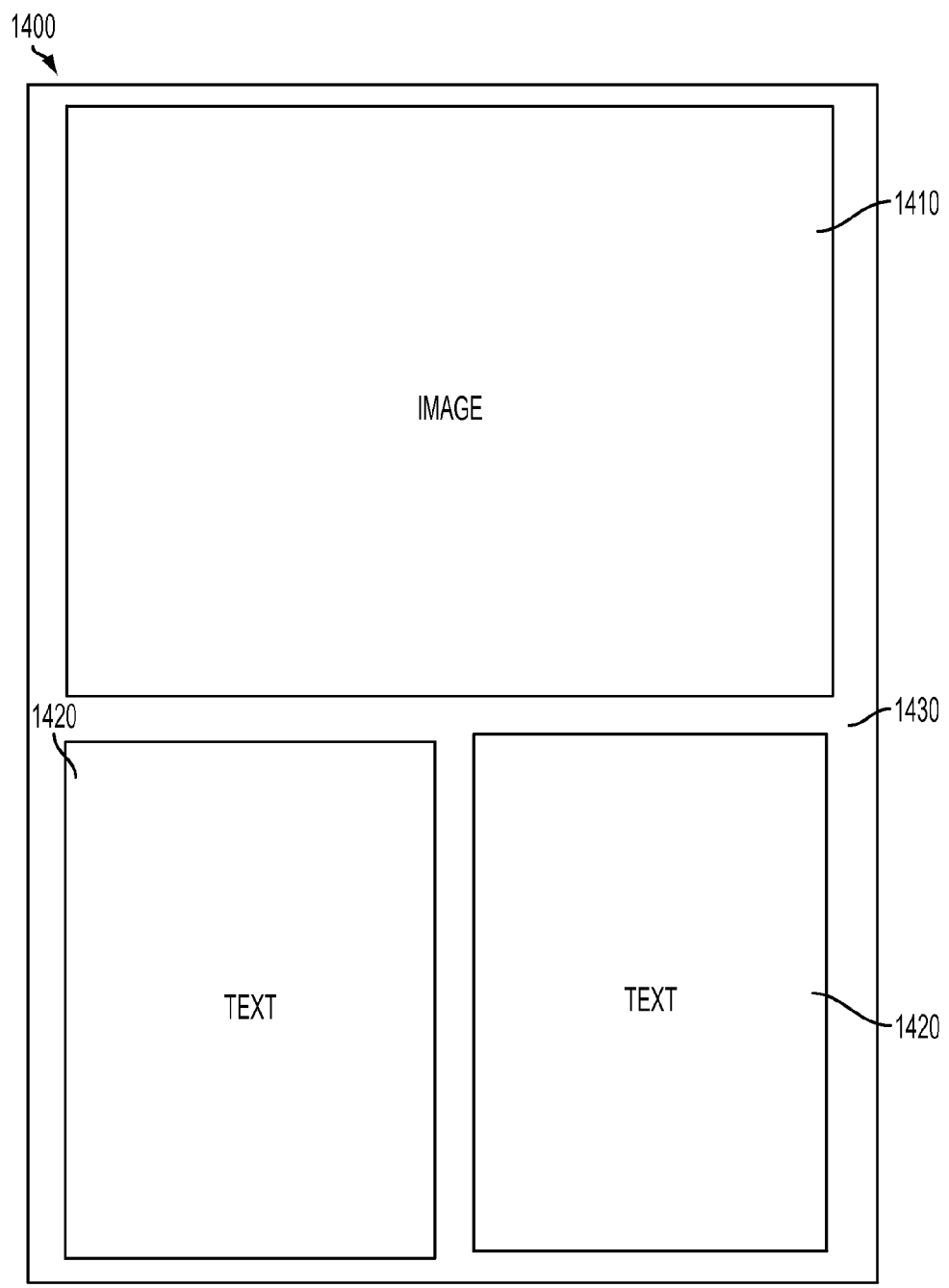
FIG. 14 illustrates 50% enlargement of the content within the second exemplary document based at least in part upon a class value associated with the content, in accordance with an exemplary embodiment.

In contrast, as shown in FIG. 14, a document 1400 utilizing the content aware enlargement algorithms described herein, contains relatively little white space. The document 1400 includes a first object type 1410, a second object type 1420 and a third object type 1430 which are equivalent to 1210, 1220 and 1230 respectively. In this embodiment, the document 1400 has a relatively larger enlargement with regard to the object types 1410 and 1420 relative to the object type 1430. The result is that the document 1400 provides a more explicit presentation of the content within the document regardless of the resizing that occurs.

Figure 15:
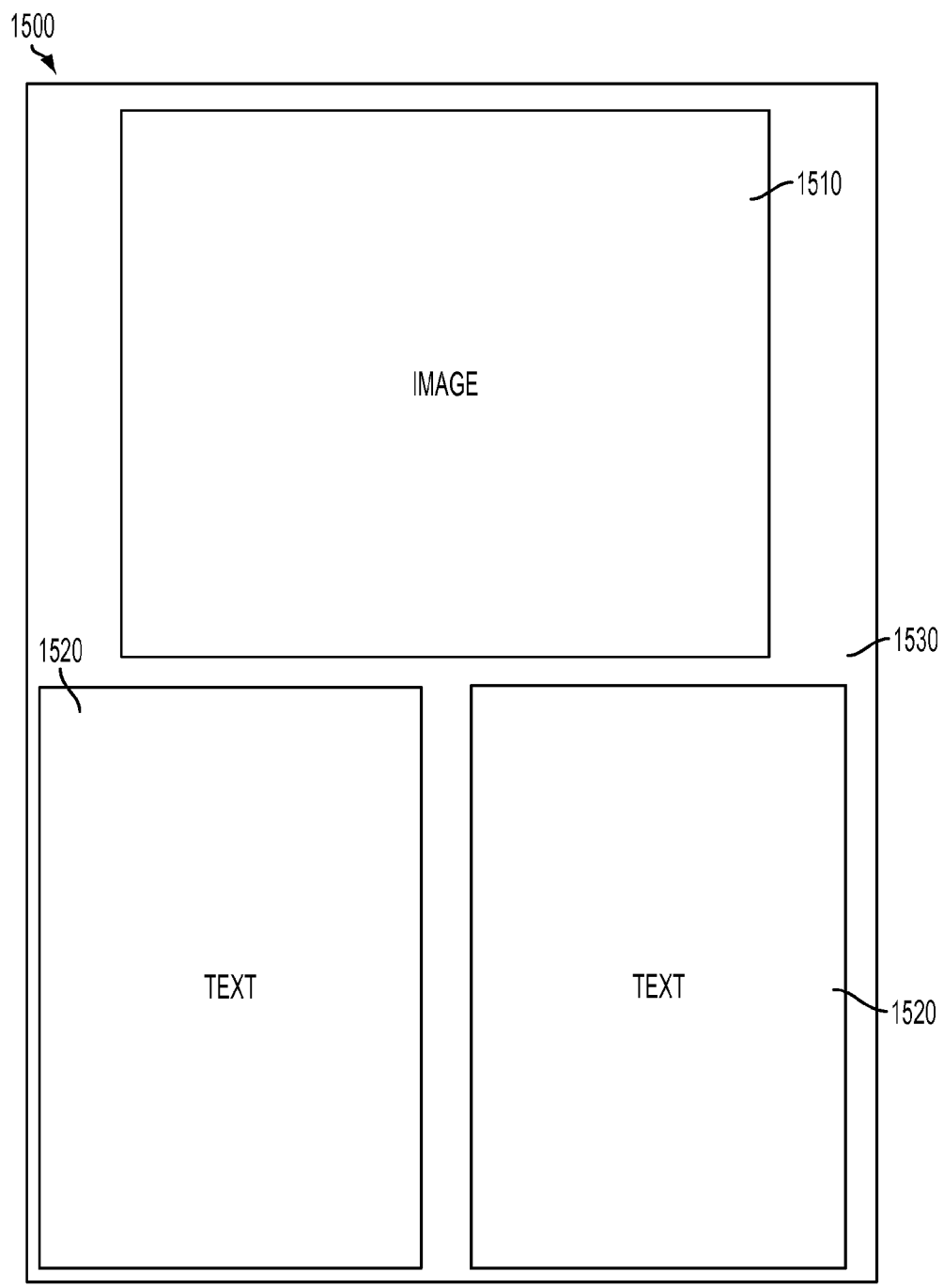
FIG. 15 illustrates 50% enlargement of the content within the second exemplary document based at least in part upon user defined prioritization of text, in accordance with an exemplary embodiment.

FIG. 15 illustrates a document 1500 that shows the content, the object type enlargement shown within the document 1400 can be based on the document segmentation class value application location scaler discussed herein. The document 1500 illustrates a specific example of an instance where an object 1520 associated with text has a higher class value than an object 1510 associated with images. In this case, the content within the object 1520 is enlarged to a greater extent than the content within the object 1510. It is to be appreciated that substantially any object that has a greater class value can be enlarged to a greater extent than an object with a lesser class value. Thus, a user can modify the rendering of document content as desired to present information in substantially any manner desired.

A computer 550 illustrates one possible hardware configuration to support the systems and methods described herein, including the methods 400 and 500 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 550 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 550 can further include a hard disk drive, a magnetic disk drive, e.g., to read from or write to a removable disk, and an optical disk drive, e.g., for reading a CD-ROM disk or to read from or write to other optical media. The computer 550 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 550 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 550 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 550 via any wireless or hard wire protocol and/or standard.

The computer 550 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device.

It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system that resizes content within a document comprising:
    a computing device comprising memory which stores instructions for resizing the content and a processor, in communication with the memory, for executing the instructions, the computing device including:
    a document segmenter that receives a document that contains disparate content, the document segmenter analyzes the content within the document and segments the content into a plurality of objects and categorizes each of the plurality of objects as one of a plurality of object types such that similar content is categorized as a same object type;
    an object priority applicator assigns image objects of an image object type to a first class level and text objects of text object type to a second class level, the object priority applicator identifies a predetermined importance value for each of the plurality of objects in the document based on the class level assigned to each of the plurality of objects;
    a location scaler that identifies a datum point for each of the plurality of objects within the document for maintaining a relative location of each of the plurality of objects relative to one another; and
    an object sizing component that disparately resizes each of the plurality of objects at the datum point of each of the plurality of objects, the image objects assigned to the first class level being resized a first predetermined amount and the text objects assigned to the second class level being resized a second predetermined amount different from the first predetermined amount, the first and second amounts each based on the importance value, wherein the image objects in the document are resized equally in the first amount and the text objects in the document are resized equally in the second amount.

2. A system according to claim 1, wherein the document is segmented via an algorithm, metadata within the document and/or imaging software.

3. A system according to claim 2, wherein the user manually selects each object via the imaging software.

4. A system according to claim 2, wherein the algorithm is a mixed raster content/multiple extracted constant color area algorithm.

5. A system according to claim 1, wherein the object priority applicator further includes a complexity component that identifies the complexity associated with each object.

6. A system according to claim 1, wherein the object priority applicator further includes an object location that evaluates the location of each object within the document and assigns a importance value that is dependent upon the object location.

7. A system according to claim 5, wherein the complexity component further includes an entropic component that identifies an entropic value associated with each object to provide a complexity value associated with each object.

8. A system according to claim 7, wherein the complexity component further includes a geometric component that identifies a geometric value associated with the complexity of each object.

9. A system according to claim 1, wherein the location scaler includes a center locating component that identifies a datum point that is located at the geometric center of each object within the document, wherein the datum points are only identified for objects that contain content.

10. A system according to claim 1, wherein the system further includes a rule store that provides parameters for resizing the objects within the document.

11. A system according to claim 10, wherein the parameters specify that each object must be at least as large as the object in the original document.

12. A system according to claim 11, wherein the rule store specifies that a minimal space must be maintained between each object after resizing.

13. A system according to claim 1, wherein the object priority applicator assigns one of a logo, a graphic, and a background object to a third class level such that the object sizing component resizes the one of the logo, a graphic, and a background object a third predetermined amount.

14. A computer-based method to resize content within a document, comprising:
receiving by a processor a document that contains disparate content;
segmenting the disparate content within the document into a plurality of objects;
categorizing each of the plurality of objects as one of a plurality of object types such that similar content is categorized as a same object type;
assigning image objects to a first class level and text objects to a second class level;
identifying a predetermined importance value for each of the plurality of objects based on the class level assigned to each of the plurality of objects;
identifying a datum point for each of the plurality of objects within the document for maintaining a relative location of each of the plurality of objects relative to one another;
resizing each of the plurality of objects at the datum point of each of the plurality of objects, wherein the images objects being resized a first predetermined amount and the text objects being resized a second predetermined amount different from the first predetermined amount, the first and second amounts each based on the importance value for each of the plurality of objects, wherein all image objects in the document are resized equally in the first amount and all text objects in the document are resized equally in the second amount;
and outputting a revised document that includes the resized objects.

15. The method according to claim 14, wherein the importance value is related to the complexity of each object.

16. The method according to claim 15, wherein the complexity of each object is based on one or more of an entropic metric and a geometric metric.

17. The method according to claim 14, wherein the resizing of the object is commensurate with the importance value.

18. The method according to claim 14, further including locating the center of each object prior to resizing.

19. The method according to claim 18, wherein each object is enlarged relative to the center point identified.

20. A computer-based method that resizes content within a document, comprising:
a processor and a memory segments disparate content within the document into objects, wherein each object is associated with an object class defined by a particular content type;
evaluating at least one of a complexity and/or a location of each object;
assigning each of the objects within the document to one of at least two class levels based on the at least one of a complexity and location;
identifying a predetermined importance value for each of the objects within the document based on the class level assigned to each of the objects within the document;
identifying a datum point for each of the objects within the document for maintaining a relative location of each of the objects within the document relative to one another;
resizing each of the objects in the document at the datum point of each of the objects in the document, wherein each of the objects assigned to the first class level is resized a first predetermined amount and each of the objects assigned to the second class level is resized a second predetermined amount different from the first predetermined amount, the first and second predetermined amounts each based on the importance value, wherein each of the objects of the first type is resized an equal first amount and each of the objects of the second type is resized an equal second amount; and
outputting a revised document that includes the resized objects.

* * * * *